United States Patent
Hsu et al.

(10) Patent No.: US 8,678,031 B2
(45) Date of Patent: Mar. 25, 2014

(54) PIPE-PASSIVATING ALKALI-INJECTING DEVICE FOR A NUCLEAR PLANT

(75) Inventors: Ning-Yih Hsu, Keelung (TW); Chieh Fang, Taipei (TW); Hwa-Yuan Tzeng, Taoyuan County (TW); Chen-To Tsai, Hsinchu (TW); Tung-Jen Wen, Hsinchu County (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 505 days.

(21) Appl. No.: 13/150,303

(22) Filed: Jun. 1, 2011

(65) Prior Publication Data

US 2012/0305593 A1 Dec. 6, 2012

(51) Int. Cl.
C23C 22/00 (2006.01)

(52) U.S. Cl.
USPC .................. 137/565.15; 137/563; 137/565.12; 137/565.3

(58) Field of Classification Search
USPC .................. 137/563, 565.01, 565.11, 565.12, 137/565.13, 565.15, 565.29, 565.3
See application file for complete search history.

(56) References Cited

U.S. PATENT DOCUMENTS

| | | | | |
|---|---|---|---|---|
| 5,203,367 A | * | 4/1993 | Akai et al. | 137/563 |
| 6,220,296 B1 | * | 4/2001 | Ragsdale et al. | 137/563 |
| 6,499,502 B1 | * | 12/2002 | Girard et al. | 137/240 |
| 6,572,255 B2 | * | 6/2003 | Husher | 366/132 |
| 6,861,033 B2 | * | 3/2005 | Mullins et al. | 137/563 |
| 7,275,928 B2 | * | 10/2007 | Kolesar et al. | 425/447 |
| 7,316,243 B2 | * | 1/2008 | Honeymann et al. | 137/563 |
| 7,661,871 B2 | * | 2/2010 | Hyatt et al. | 137/563 |

FOREIGN PATENT DOCUMENTS

GB 2093803 A * 9/1982

* cited by examiner

*Primary Examiner* — John Rivell
(74) *Attorney, Agent, or Firm* — Jackson IPG PLLC

(57) ABSTRACT

A nuclear plant is provided with a pipe-passivating alkali-injecting device including an alkali-injecting tank, an actuator, a counter-balance valve, a pressure gauge, exhaust valves and switching valves. The actuator is connected to the alkali-injecting tank via a first pipe. The counter-balance valve is connected to the actuator via a second pipe and connected to the alkali-injecting tank via a third pipe. The pressure gauge is provided between the actuator and the counter-balance valve and connected to the second pipe. The exhaust valves are connected to the first and second pipes, and so are the switching valves. The alkali-injecting tank, the actuator and the counter-balance valve are used together to expel gases from the pipes while injecting alkali, thus effectively avoiding feedback of liquid in the nuclear plant, transmitting pure alkali in the pipes, and reducing damage to the pipes.

8 Claims, 1 Drawing Sheet

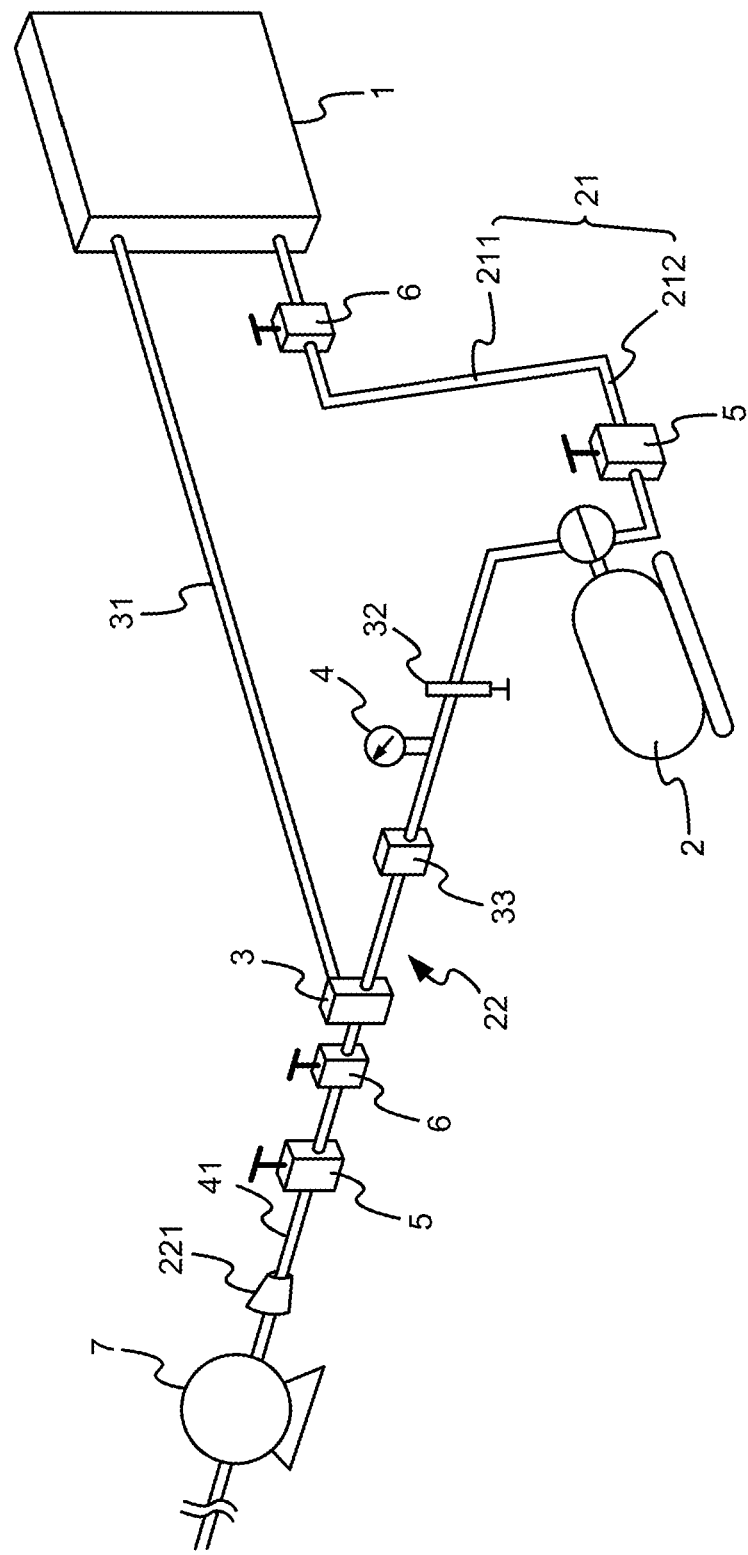

PIPE-PASSIVATING ALKALI-INJECTING DEVICE FOR A NUCLEAR PLANT

BACKGROUND OF INVENTION

1. Field of Invention

The present invention relates to a nuclear plant and, more particularly, to a pipe-passivating alkali-injecting device for a nuclear plant.

2. Related Prior Art

To passivate a pipe in a power plant, alkali is injected into the pipe from a container to expel air and/or gases from the pipe through an exhaust valve. With the exhaust valve, the air and/or gases is supposed to be expelled from the pipe. However, there could be some air and/or gases left in the pipe, and this could not be accepted since the pipe is arranged before a pump and the residual air and/or gases and the residual air and/or gases would later enter and cause the pump to fail. Such failure of the pump would reduce the life of the pump, increase the cost of the maintenance of the pump and increase risks of the operation of the plant.

The present invention is therefore intended to obviate or at least alleviate the problems encountered in prior art.

SUMMARY OF INVENTION

It is the primary objective of the present invention to provide a pipe-passivating alkali-injecting device for a nuclear plant.

To achieve the foregoing objectives, the pipe-passivating alkali-injecting device includes an alkali-injecting tank, an actuator, a counter-balance valve, a pressure gauge, exhaust valves and switching valves. The alkali-injecting tank is filled with a proper amount of alkali. There is a first pipe for connecting the alkali-injecting tank to the actuator. There is a second pipe for connecting the counter-balance valve to the actuator. There is a third pipe for connecting the counter-balance valve to the alkali-injecting tank. There is a fourth pipe for connecting the counter-balance valve to a pump of the power plant. The exhaust valves are arranged on the first and fourth pipes. The switching valves are arranged on the first and fourth pipes.

In an aspect, the first pipe is an L-shaped pipe including a first section extending from the alkali-injecting tank and a second section tilting by an angle of 30 degrees toward the actuator.

In another aspect, the actuator is a reciprocal pump.

In another aspect, the second pipe tilts by an angle of 30 degrees toward the actuator.

In another aspect, the pipe-passivating alkali-injecting device further includes a converging tube arranged on the fourth pipe.

In another aspect, the pipe-passivating alkali-injecting device further includes a relief valve arranged on the second pipe between the actuator and the counter-balance valve and a check valve arranged on the second pipe between the actuator and the counter-balance valve.

Other objectives, advantages and features of the present invention will be apparent from the following description referring to the attached drawings.

BRIEF DESCRIPTION OF DRAWING

The present invention will be described via detailed illustration of the preferred embodiment referring to the drawing wherein:

FIG. 1 is a perspective view of a pipe-passivating alkali-injecting device for a nuclear plant according to the preferred embodiment of this invention.

DETAILED DESCRIPTION OF PREFERRED EMBODIMENT

Referring to FIG. 1, there is shown a pipe-passivating alkali-injecting device for a nuclear plant according to the preferred embodiment of the present invention. The pipe-passivating alkali-injecting device includes an alkali-injecting tank 1, an actuator 2, a counter-balance valve 3, a pressure gauge 4, exhaust valves 5 and switching valves 6. The alkali-injecting tank 1 is filled with a proper amount of alkali.

The actuator 2 is a reciprocal pump connected to the alkali-injecting tank 1 via a first pipe 21. The actuator 2 is located below the alkali-injecting tank 1 as shown; however the actuator 2 may be located above or to the left or right of the alkali-injecting tank 1. The first pipe 21 is an L-shaped pipe formed with a first section 211 and a second section 212. The second section 212 of the first pipe 21 is tilted by an angle of 30 degrees toward the actuator 2.

The counter-balance valve 3 is connected to the actuator 2 via a second pipe 22 and connected to the alkali-injecting tank 1 via a third pipe. 31. The second pipe 22 includes a section tilted by an angle of 30 degrees toward the actuator 2.

The pressure gauge 4 is provided at a point of the second pipe 22, i.e., the pressure gauge 4 is located between the actuator 2 and the counter-balance valve and connected to the second pipe.

A relief valve 32 is arranged at a point of the second pipe 22 between the actuator 2 and the pressure gauge 4. A check valve 33 is arranged at a point of the second pipe 22 between the counter-balance valve 3 and the pressure gauge 4.

A pump 7 of the power plant is connected to the counter-pressure valve 3 through a fourth pipe 41.

One of the exhaust valves 5 is arranged at a point of the first pipe 21. The other exhaust valve 5 is arranged at a point of the fourth pipe 41.

One of the switching valves 6 is arranged at a point of the first pipe 21. The other switching valve 6 is arranged at a point of the fourth pipe 41.

A converging tube 221 is arranged at a point of the fourth pipe 41. The converging tube 221 converges as it extends to the counter-balance valve 3 from the pump 7.

In operation, the switching valve 6 provided on the first pipe 21 is opened to allow the alkali to travel from the alkali-injecting tank 1 into the actuator 2 through the first pipe 21 because of weight. The switching valve 6 provided on the fourth pipe 41 is closed so that the actuator 2 drives the alkali into the counter-balance valve 3 through the second pipe 22 and drives any gases produced during the flow of the alkali into the alkali-injecting tank 1 through the third pipe 31. The circulation of the alkali is repeated several times so that there is not any gas in the first pipe 21 and the second pipe 22. The check valve 33 prevents the alkali from returning into the actuator 2. Then, the switching valve 6 arranged on the fourth pipe 41 is opened to allow the alkali to travel into the pump 7 through the converging pipe 221 arranged on the fourth pipe 41.

The second section 212 of the first pipe 21 tilts by an angle of 30 degrees toward the actuator 2, and the second pipe 22 tilts by an angle of 30 degrees toward the actuator 2 so that the gases produced during the travel of the alkali tend to travel upward and do not accumulate in the first pipe 21 and the second pipe 22. If needed, in the transmission of the alkali, the exhaust valves 5 can be opened independent of one another to exhaust the gases. The pressure of the alkali can be inspected by watching the pressure gauge 4 at any point of time. The relief valve 32 can be opened to reduce the pressure if the pressure of the alkali is excessively high. Moreover, if the pressure of the alkali is excessively high and higher than the pressure of the power plant, the counter-balance valve 3 can be opened to transmit the gases to the alkali 1 to avoid feedback of the alkali. Thus, pure alkali can be obtained in the pipes, and an oxide film can be formed in the pipes, to reduce damages on the pipes.

According to the present invention, the alkali-injecting tank, the actuator and the counter-balance valve are advantageously used together to exhaust gases from the pipes while injecting alkali. Thus, feedback of liquid in the nuclear plant is effectively prevented. Moreover, pure alkali is transmitted in the pipes. Furthermore, damage to the pipes is reduced.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A pipe-passivating alkali-injecting device for use in a nuclear plant, the pipe-passivating alkali-injecting device including:
   an alkali-injecting tank (1) filled with a proper amount of alkali;
   an actuator (2);
   a counter-balance valve (3);
   a first pipe (21) for connecting the alkali-injecting tank (1) to the actuator (2);
      wherein the first pipe (21) is an L-shaped pipe including:
         a first section (211) extending from the alkali-injecting tank (1); and
         a second section (212) tilting by an angle of 30 degrees toward the actuator (2);
   a second pipe (22) for connecting the counter-balance valve (3) to the actuator (2);
   a third pipe (31) for connecting the counter-balance valve (3) to the alkali-injecting tank (1);
   a fourth pipe (41) for connecting the counter-balance valve (3) to a pump (7) of the nuclear plant;
   a pressure gauge (4) arranged on the second pipe (22);
   exhaust valves (5) arranged on the first and fourth pipes (21, 41); and
   switching valves (6) arranged on the first and fourth pipes (21, 41).

2. The pipe-passivating alkali-injecting device according to claim 1,
   wherein the actuator (2) is a reciprocal pump.

3. The pipe-passivating alkali-injecting device according to claim 1,
   wherein the second pipe (22) tilts by an angle of 30 degrees toward the actuator (2).

4. The pipe-passivating alkali-injecting device according to claim 1, further including a converging tube (221) arranged on the fourth pipe (41).

5. The pipe-passivating alkali-injecting device according to claim 1, further including:
   a relief valve (32) arranged on the second pipe (22) between the actuator (2) and the counter-balance valve (3); and
   a check valve (33) arranged on the second pipe (22) between the actuator (2) and the counter-balance valve (3).

6. A pipe-passivating alkali-injecting device for use in a nuclear plant, the pipe-passivating alkali-injecting device including:
   an alkali-injecting tank (1) filled with a proper amount of alkali;
   an actuator (2);
   a counter-balance valve (3);
   a first pipe (21) for connecting the alkali-injecting tank (1) to the actuator (2);
   a second pipe (22) for connecting the counter-balance valve (3) to the actuator (2);
      wherein the second pipe (22) tilts by an angle of 30 degrees toward the actuator (2);
   a third pipe (31) for connecting the counter-balance valve (3) to the alkali-injecting tank (1);
   a fourth pipe (41) for connecting the counter-balance valve (3) to a pump (7) of the nuclear plant;
   a pressure gauge (4) arranged on the second pipe (22);
   exhaust valves (5) arranged on the first and fourth pipes (21, 41); and
   switching valves (6) arranged on the first and fourth pipes (21, 41).

7. A pipe-passivating alkali-injecting device for use in a nuclear plant, the pipe-passivating alkali-injecting device including:
   an alkali-injecting tank (1) filled with a proper amount of alkali;
   an actuator (2);
   a counter-balance valve (3);
   a first pipe (21) for connecting the alkali-injecting tank (1) to the actuator (2);
   a second pipe (22) for connecting the counter-balance valve (3) to the actuator (2);
   a third pipe (31) for connecting the counter-balance valve (3) to the alkali-injecting tank (1);
   a fourth pipe (41) for connecting the counter-balance valve (3) to a pump (7) of the nuclear plant;
   a converging tube (221) arranged on the fourth pipe (41);
   a pressure gauge (4) arranged on the second pipe (22);
   exhaust valves (5) arranged on the first and fourth pipes (21, 41); and
   switching valves (6) arranged on the first and fourth pipes (21, 41).

8. A pipe-passivating alkali-injecting device for use in a nuclear plant, the pipe-passivating alkali-injecting device including:
   an alkali-injecting tank (1) filled with a proper amount of alkali;
   an actuator (2);
   a counter-balance valve (3);
   a first pipe (21) for connecting the alkali-injecting tank (1) to the actuator (2);
   a second pipe (22) for connecting the counter-balance valve (3) to the actuator (2);
   a relief valve (32) arranged on the second pipe (22) between the actuator (2) and the counter-balance valve (3); and
   a check valve (33) arranged on the second pipe (22) between the actuator (2) and the counter-balance valve (3);
   a third pipe (31) for connecting the counter-balance valve (3) to the alkali-injecting tank (1);
   a fourth pipe (41) for connecting the counter-balance valve (3) to a pump (7) of the nuclear plant;
   a pressure gauge (4) arranged on the second pipe (22);
   exhaust valves (5) arranged on the first and fourth pipes (21, 41); and
   switching valves (6) arranged on the first and fourth pipes (21, 41).

* * * * *